(12) United States Patent
Hawkins et al.

(10) Patent No.: US 9,756,376 B2
(45) Date of Patent: *Sep. 5, 2017

(54) MULTI-LINGUAL AUDIO STREAMING

(71) Applicant: Time Warner Cable Enterprises LLC, New York, NY (US)

(72) Inventors: Sherisse Hawkins, Boulder, CO (US); Matthew Osminer, Erie, CO (US); Chris Cholas, Frederick, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,678

(22) Filed: Jul. 13, 2016

(65) Prior Publication Data

US 2017/0013305 A1     Jan. 12, 2017

Related U.S. Application Data

(63) Continuation of application No. 13/094,992, filed on Apr. 27, 2011, now Pat. No. 9,398,322.

(51) Int. Cl.
    *H04N 21/43*     (2011.01)
    *H04N 21/414*     (2011.01)
              (Continued)

(52) U.S. Cl.
    CPC ........... *H04N 21/4307* (2013.01); *H04N 5/04* (2013.01); *H04N 21/4126* (2013.01);
              (Continued)

(58) Field of Classification Search
    CPC ......... H04N 21/4307; H04N 21/41415; H04N 21/8106; H04N 5/04; H04N 21/4856; H04N 21/4126
See application file for complete search history.

(56) References Cited

U.S. PATENT DOCUMENTS

| 4,163,123 A | 7/1979 | Brodsky |
| 5,594,660 A | 1/1997 | Sung |
| (Continued) | | |

OTHER PUBLICATIONS

Nick Tanton et al. "Audio Description: What it is and how it works". BBC—White Paper WHP051, Oct. 2002, revised Jul. 2004.

(Continued)

*Primary Examiner* — Benjamin R Bruckart
*Assistant Examiner* — Jason Thomas
(74) *Attorney, Agent, or Firm* — Otterstedt, Ellenbogen & Kammer, LLP

(57) ABSTRACT

Digital video data and digital multiple-audio data are extracted from a source, using a hardware processor in a content source device within a premises. The extracted digital video data is processed for display on a main display device in the premises; and the extracted digital multiple-audio data is processed into a primary soundtrack in a primary language, to be listened to within the premises in synchronization with the displayed extracted digital video data. The primary soundtrack corresponds to the displayed extracted digital video data, in the primary language. The extracted digital multiple-audio data is processed into at least one secondary audio asset, different than the primary soundtrack; and the at least one secondary audio asset is transmitted to a personal media device within the premises, for apprehension by a user of the personal media device in synchronization with the displayed extracted digital video data.

8 Claims, 10 Drawing Sheets

(51) Int. Cl.
  *H04N 5/04* (2006.01)
  *H04N 21/485* (2011.01)
  *H04N 21/81* (2011.01)
  *H04N 21/41* (2011.01)
  *H04N 21/4363* (2011.01)

(52) U.S. Cl.
  CPC ... *H04N 21/41415* (2013.01); *H04N 21/4363* (2013.01); *H04N 21/4856* (2013.01); *H04N 21/8106* (2013.01)

(56) References Cited

U.S. PATENT DOCUMENTS

| | | | |
|---|---|---|---|
| 5,959,684 | A | 9/1999 | Tan |
| 6,785,539 | B2 | 8/2004 | Hale et al. |
| 7,051,360 | B1 | 5/2006 | Ellis et al. |
| 7,412,533 | B1 | 8/2008 | Johnson et al. |
| 9,398,322 | B2 | 7/2016 | Hawkins et al. |
| 2003/0056217 | A1 | 3/2003 | Brooks |
| 2004/0027496 | A1 | 2/2004 | Morales |
| 2005/0028208 | A1 | 2/2005 | Ellis et al. |
| 2005/0276282 | A1 | 12/2005 | Wells |
| 2007/0022447 | A1 | 1/2007 | Arseneau et al. |
| 2007/0124777 | A1 | 5/2007 | Bennett et al. |
| 2008/0131075 | A1* | 6/2008 | Pontual ............. H04N 5/783 386/343 |
| 2008/0152309 | A1 | 6/2008 | Shih |
| 2009/0017879 | A1 | 1/2009 | Tsfaty et al. |
| 2009/0141875 | A1 | 6/2009 | Demmitt et al. |
| 2009/0248794 | A1 | 10/2009 | Helms |
| 2009/0288132 | A1* | 11/2009 | Hegde ............. G08C 17/02 725/141 |
| 2010/0295993 | A1 | 11/2010 | Oh |
| 2010/0313236 | A1 | 12/2010 | Straub |

OTHER PUBLICATIONS

"Information Technology—Generic coding of moving pictures and associated audio information" ISO/IEC 13818-3, Second edition, Apr. 15, 1998.

"Networked Digital Media Standards a UPnP/DLNA Overview" Understanding DLNA, Allegro Softwear Development Corp. Oct. 2006.

"MPEG Transport stream" downloaded Apr. 4, 2011 from http://en.wikipedia.org/wiki/MPEG_transport_stream.

"ISO 639.2 Language Code List" downloaded Apr. 5, 2011 from http://www.loc.gov/standards/iso639-2/php/code_list.php.

"CS5364/66/68" downloaded Mar. 13, 2011 from http://www.cirrus.com/en/products/cs5364-66-68.html.

"Closed captioning" downloaded Apr. 5, 2011 from http://en.wikipedia.org/wiki/Closed_captioning.

"DVD-Video" downloaded Apr. 5, 2011 from http://en.wikipedia.org/wiki/DVD-Video.

Parlamo—What Is Parlamo, downloded from http://parlamo.com/ on Apr. 5, 2011.

\* cited by examiner

MULTI-LINGUAL AUDIO STREAMING

CROSS-REFERENCE TO RELATED APPLICATION

This application is a continuation, under 37 CFR 1.53(b), of co-assigned U.S. patent application Ser. No. 13/094,992 of inventors Sherisse Hawkins et al., and claims the benefit thereof, said application Ser. No. 13/094,992 having been filed on Apr. 27, 2011, and entitled "MULTI-LINGUAL AUDIO STREAMING." The complete disclosure of the aforesaid application Ser. No. 13/094,992 is expressly incorporated herein by reference in its entirety for all purposes.

FIELD OF THE INVENTION

The present invention relates generally to the electrical, electronic, and computer arts, and more particularly relates to video content networks.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well-known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs, encoded with different clocks, can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Within recent years a proliferation of hand held multimedia devices have entered the market. These devices contain visual displays as well as audio outputs and connectivity to wireless Internet and intranet via, for example, IEEE 802.11n or Bluetooth® technology (registered certification mark of BLUETOOTH SIG, INC. Suite 350, 5209 Lake Washington Boulevard, Kirkland Wash. 98033, USA). Many of these devices provide methods for software developers who are not related to the manufacturer to embellish their capabilities with their own applications. Examples of such manufacturers are Apple Inc. and Google Inc. Apple provides a device called the IPOD TOUCH® (registered mark of Apple Inc., Cupertino Calif. 95014 USA) and Google provides a multiple platform operating system called ANDROID® (registered mark of Google Inc., 1600 Amphitheatre Parkway, Mountain View Calif. 94043 USA) that enables similar functionality on a plethora of devices. Cable television and Telecom Internet providers have provided household connectivity by both wired and wireless systems, such that television content can be passed between multiple internet-connected devices, which present video and audio content to their customers.

At this point, it should be noted that market research has shown that an increasing number of families have a mixture of language capability. As families migrate to the United States the younger generation learns English while the older generations remain speaking their native language. In this regard, it is known (so-called subtitles) to provide a textual representation of the words spoken in one language that are translated into another and overlaid on the television screen. Digital Versatile Disks (DVDs) may contain a selection of languages that can be presented, but only one language at a time can be played. Furthermore, museums and special exhibits have also provided multi-lingual audio devices to provide individually paced audio tours.

SUMMARY OF THE INVENTION

Techniques are provided for multi-lingual audio streaming.

In one aspect, an exemplary method includes the steps of extracting digital video data and digital multiple-audio data from a source, using a hardware processor in a content source device within a premises; processing the extracted digital video data for display on a main display device in the premises; and processing the extracted digital multiple-audio data into a primary soundtrack in a primary language, to be listened to within the premises in synchronization with the displayed extracted digital video data. The primary soundtrack corresponds to the displayed extracted digital video data, in the primary language. Additional steps include processing the extracted digital multiple-audio data into at least one secondary audio asset, different than the primary soundtrack; and transmitting the at least one secondary audio asset to a personal media device within the premises, for apprehension by a user of the personal media device in synchronization with the displayed extracted digital video data.

In another aspect, an exemplary method is provided for interaction between a personal media device and a content source device which provides, within a premises, digital video data for display on a main display device in the premises, and a primary soundtrack in a primary language, to be listened to within the premises in synchronization with the displayed digital video data. The method includes the step of obtaining, at the personal media device within the premises, from the content source device within the premises, a representation of a menu. The representation of the menu includes data indicative of available forms of a secondary audio asset. Additional steps include providing, from the personal media device, to the content source device, a menu selection specifying a chosen form of the secondary audio asset; and obtaining, at the personal media device, from the content source device, the secondary audio asset, for apprehension by a user of the personal media device in synchronization with the displayed digital video data. The secondary audio asset is different than the primary soundtrack.

In still another aspect, an exemplary system includes a main memory; a main hardware processor coupled to the main memory; a source of digital video data and digital multiple-audio data in data communication with the main hardware processor; a wireless interface coupled to the main hardware processor; and a graphics processor coupled to the main hardware processor. The main hardware processor and the main memory are cooperatively configured to: extract the digital video data and the digital multiple-audio data from the source; process the extracted digital video data and route the extracted video data to the graphics processor for display in a premises; and process the extracted digital multiple-audio data into a primary soundtrack in a primary language, to be listened to within the premises in synchronization with the displayed extracted digital video data. The primary soundtrack corresponds to the displayed extracted digital video data, in the primary language. The main hardware processor and the main memory are also cooperatively configured to process the extracted digital multiple-audio data into at least one secondary audio asset, different than the primary soundtrack. The wireless interface is configured to facilitate transmitting the at least one secondary audio asset to a personal media device within the premises, for apprehension by a user of the personal media device in synchronization with the displayed extracted digital video data.

In some instances, the system further includes one or more appropriately configured personal media devices.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects, including bandwidth savings within a premises environment by selectively broadcasting only needed secondary audio assets.

These and other features and advantages of the invention will become apparent from the following detailed description of illustrative embodiments thereof, which is to be read in connection with the accompanying drawings.

DETAILED DESCRIPTION OF PREFERRED EMBODIMENTS

Figure 1:
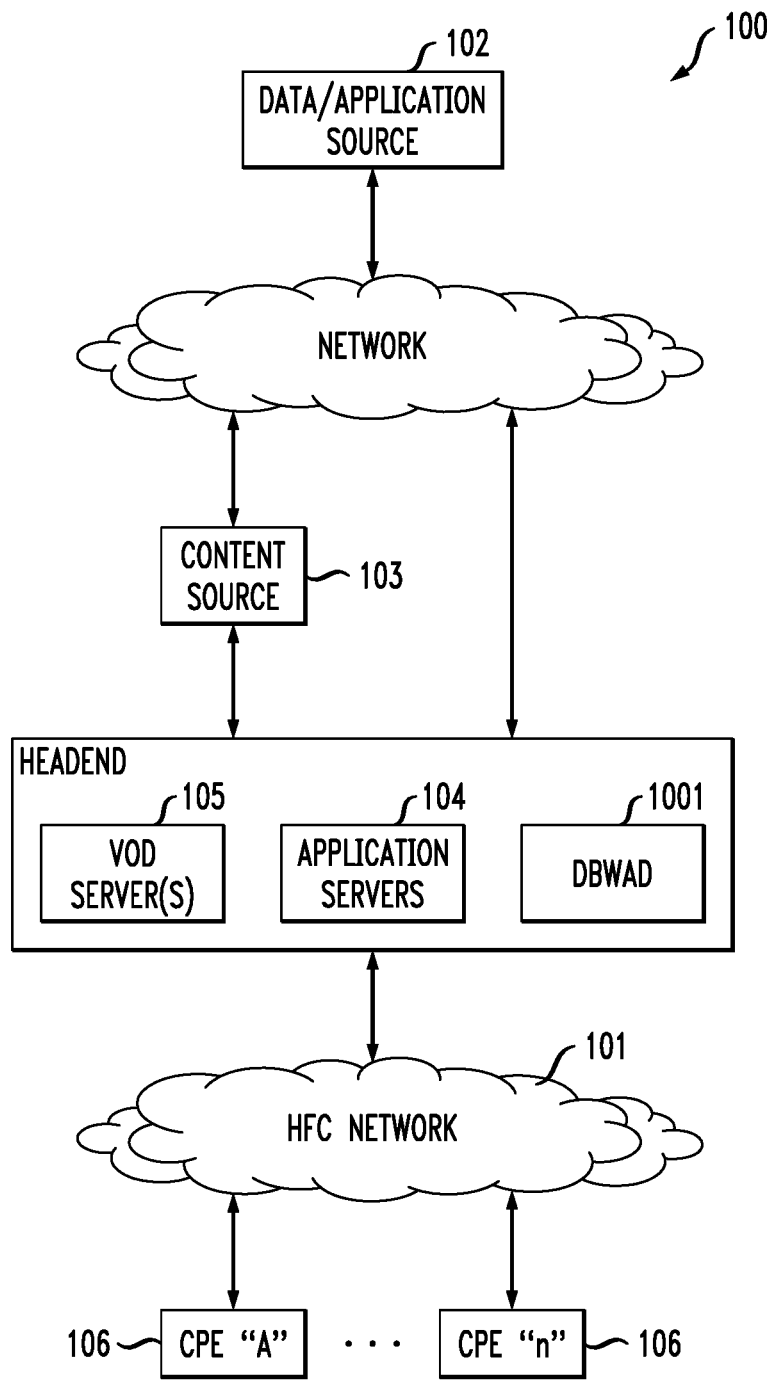
FIG. 1 is a functional block diagram illustrating an exemplary hybrid fiber-coaxial (HFC) network configuration.

FIG. 1 illustrates a typical content-based network configuration 100. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. Also included is a dynamic bandwidth allocation device (DBWAD) 1001 such as a global session resource manager, which is itself a non-limiting example of a session resource manager. The distribution server(s) 104, VOD servers 105, DBWAD 1001, and CPE(s) 106 are connected via a bearer (e.g., hybrid fiber cable (HFC)) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1A (described in greater detail below) may be used.

It should be noted at this point that in addition to a conventional HFC network or a switched digital network, other kinds of video content networks can be employed for network 101 (e.g., fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104 (for example, over a suitable network, not separately numbered). This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box," and the like.

Figure 1A:
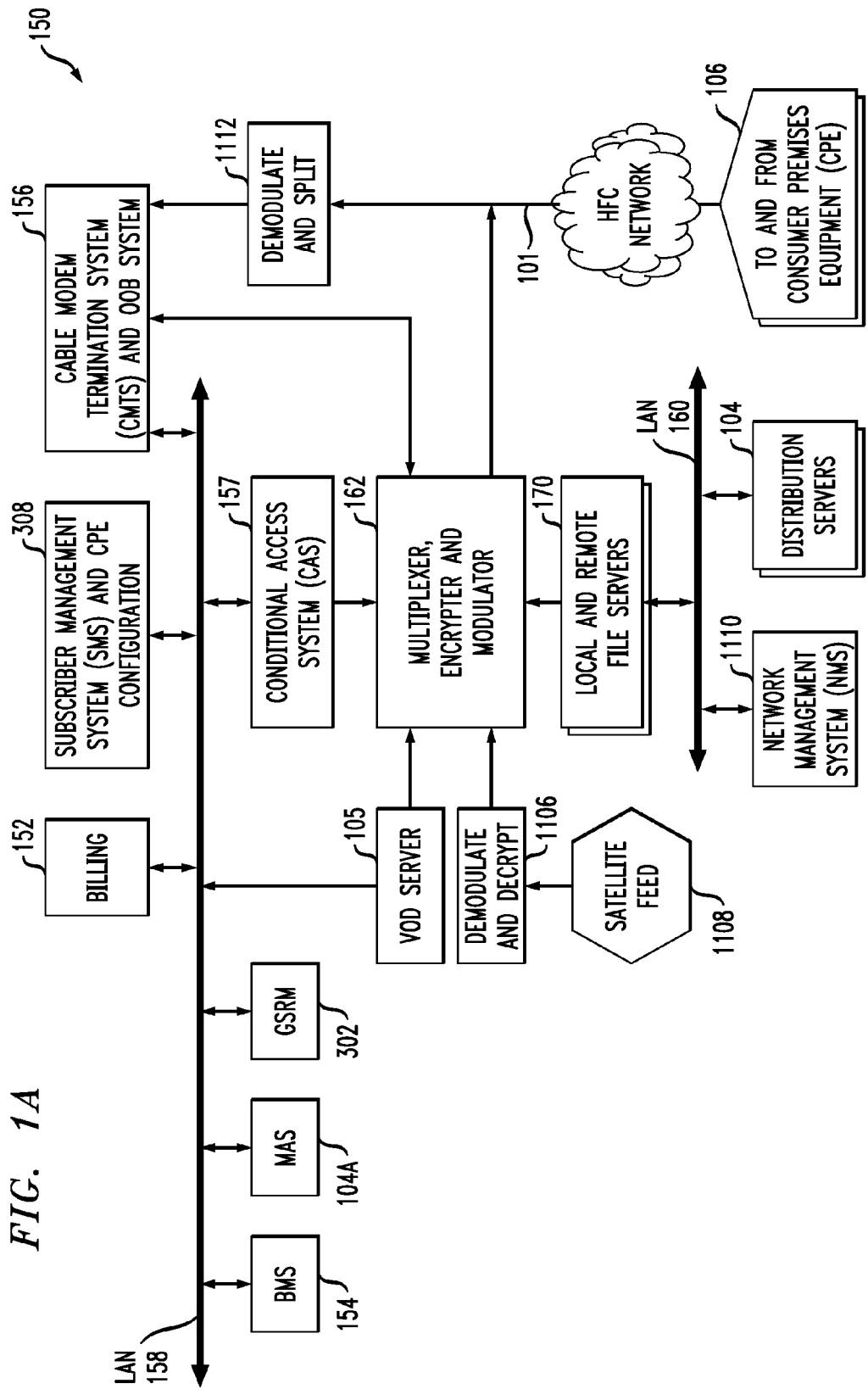
FIG. 1A is a functional block diagram illustrating one exemplary HFC cable network head-end configuration.

Referring now to FIG. 1A, one exemplary embodiment of a head-end architecture is described. As shown in FIG. 1A, the head-end architecture 150 comprises typical head-end components and services including billing module 152, subscriber management system (SMS) and CPE configuration management module 308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1A is high-level, conceptual architecture and that each multi-service operator or multiple system operator (MSO) may have multiple head-ends deployed using custom architectures.

The architecture 150 of FIG. 1A further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1B) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 1A are a global session resource manager (GSRM) 302, a Mystro Application Server 104A, and a business management system 154, all of which are coupled to LAN 158. GSRM 302 is one specific form of a DBWAD 1001 and is a non-limiting example of a session resource manager.

Figure 1B:
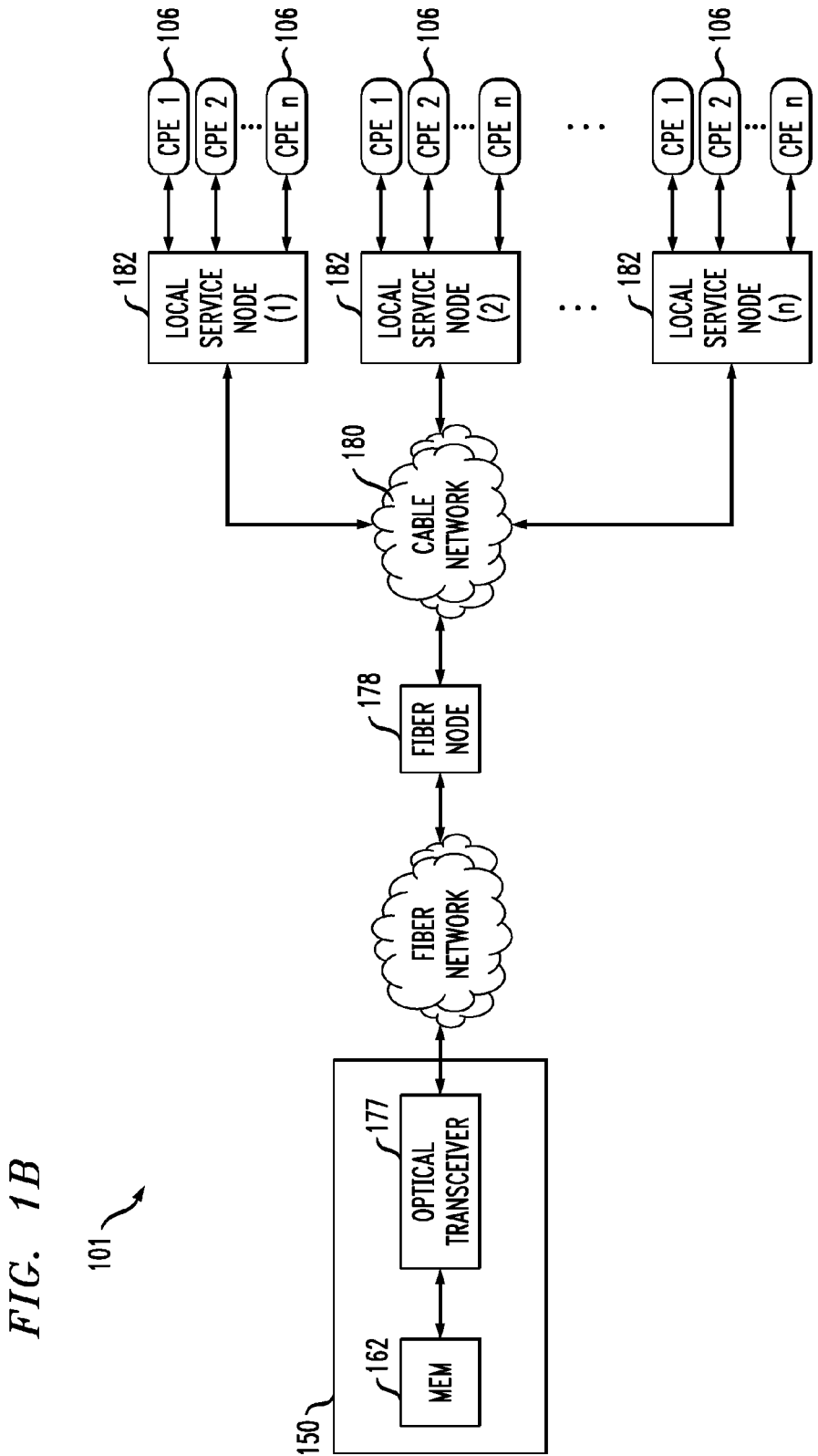
FIG. 1B is a functional block diagram illustrating one exemplary local service node configuration.

As shown in FIG. 1B, the network 101 of FIGS. 1 and 1A comprises a fiber/coax arrangement wherein the output of the MEM 162 of FIG. 1A is transferred to the optical domain (such as via an optical transceiver 177 at the head-end 150 or further downstream). The optical domain signals are then distributed to a fiber node 178, which further distributes the signals over a distribution network 180 to a plurality of local servicing nodes 182. This provides an effective 1:N expansion of the network at the local service end.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood.

Note that reference is made herein, for brevity, to features of the "Brooks invention"—it should be understood that no inference should be drawn that such features are necessarily present in all claimed embodiments of Brooks.

The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device.

In one or more embodiments, an exemplary method provides the audio portion of an audio-video presentation in a plurality of languages simultaneously to multiple users and an exemplary system distributes individual channels of the audio to specific users under control of the users.

As noted above, market research has shown that an increasing number of families have a mixture of language capability. As families migrate to the United States the younger generation learns English while the older generations remain speaking their native language. In this regard, it is known (so-called subtitles) to provide a textual representation of the words spoken in one language that are translated into another and overlaid on the television screen. Text on the video overlays portions of the screen presentation and may obscure visual items making such technology less than desirable. Digital Versatile Disks (DVDs) may contain a selection of languages that can be presented, but only one language at a time can be played. Furthermore, museums and special exhibits have also provided multilingual audio devices to provide individually paced audio tours. These devices and systems suffer from a lack of synchronization between listeners.

As also noted above, within recent years a proliferation of hand held multi-media devices have entered the market. These devices contain visual displays as well as audio outputs and connectivity to wireless Internet and Intranet via, for example, IEEE 802.11n or Bluetooth® technology. Many of these devices provide methods for software developers who are not related to the manufacturer to embellish their capabilities with their own applications. Examples of such manufacturers are Apple Inc. and Google Inc. Apple provides a device called the IPOD TOUCH® and Google provides a multiple platform operating system called ANDROID® that enables similar functionality on a plethora of devices. Cable television and Telecom Internet providers have provided household connectivity by both wired and wireless systems, such that television content can be passed between multiple internet-connected devices, which present video and audio content to their customers.

One or more embodiments of the invention provide per-user customizable language audio options to groups of individuals sharing the same video presentation.

One or more embodiments of the invention provide per-user customizable access to alternative audio content options to groups of individuals sharing the same video presentation.

One or more embodiments of the invention provide per-user customizable access to language-specific textual displays of the audio content to groups of individuals sharing the same video presentation.

One or more embodiments of the invention provide per-user customizable access to language-specific ancillary information concerning a video display being shared between members of a group of observers.

Some embodiments provide, as a secondary audio asset, "Descriptive Audio" as defined by the "Twenty-First Century Communications and Video Accessibility Act of 2010." This is not a language per se but is an additional audible track. This descriptive audio is typically used by visually impaired persons who wish to enjoy television, and typically includes descriptions of what is happening in the video as well as the normal dialog and other sounds, music, and so on. In general, it may be in the same or a different language as the primary soundtrack in the primary language.

In at least some instances, a software application on portable multi-media devices communicates with the home wireless system and allows the user to (i) open a data channel to the device providing the content; (ii) select one of a plurality of available audio or descriptive text options available with the content; and (iii) begin listening to the audio selection or reading the text that is synchronized with the visual display.

Figure 2:
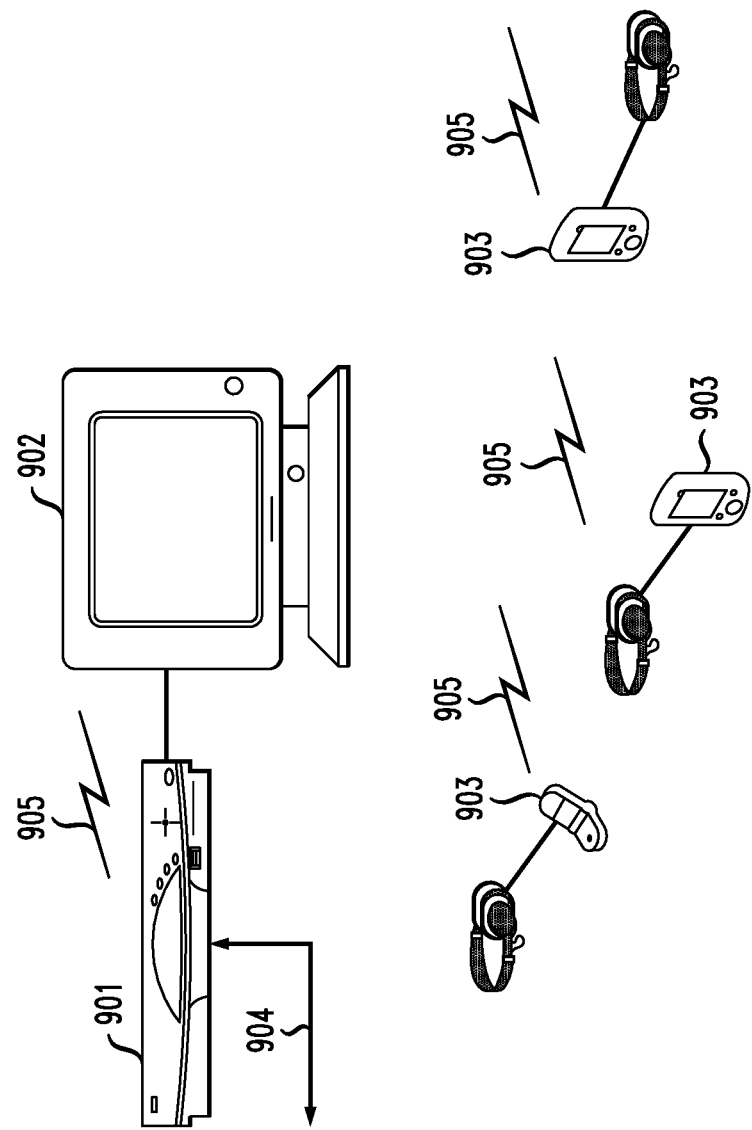
FIG. 2 shows at least a portion of a system for multi-lingual audio streaming within a home or other premises, according to an aspect of the invention.

Initially, an overview of FIGS. 2-6 will be provided. Referring now to FIG. 2, elements 901 is a source of digital audio and video content that contains a mechanism for transmitting the audio and textual descriptive content to a remote presentation device. Element 902 is a video display device such as a television or video monitor that may embody within it the digital content source shown as 901. Element 903 is a personal media device such as an Apple IPOD TOUCH® or a high end cell phone with a personal listening device such as a headphone attached. Element 904 is a connection between the audio/video source device and the intranet and/or Internet; this connection may be wireless as well. Symbols 905 represent a radio frequency communication channel that is accessible by the personal media devices and the audio/video source.

Figure 3:
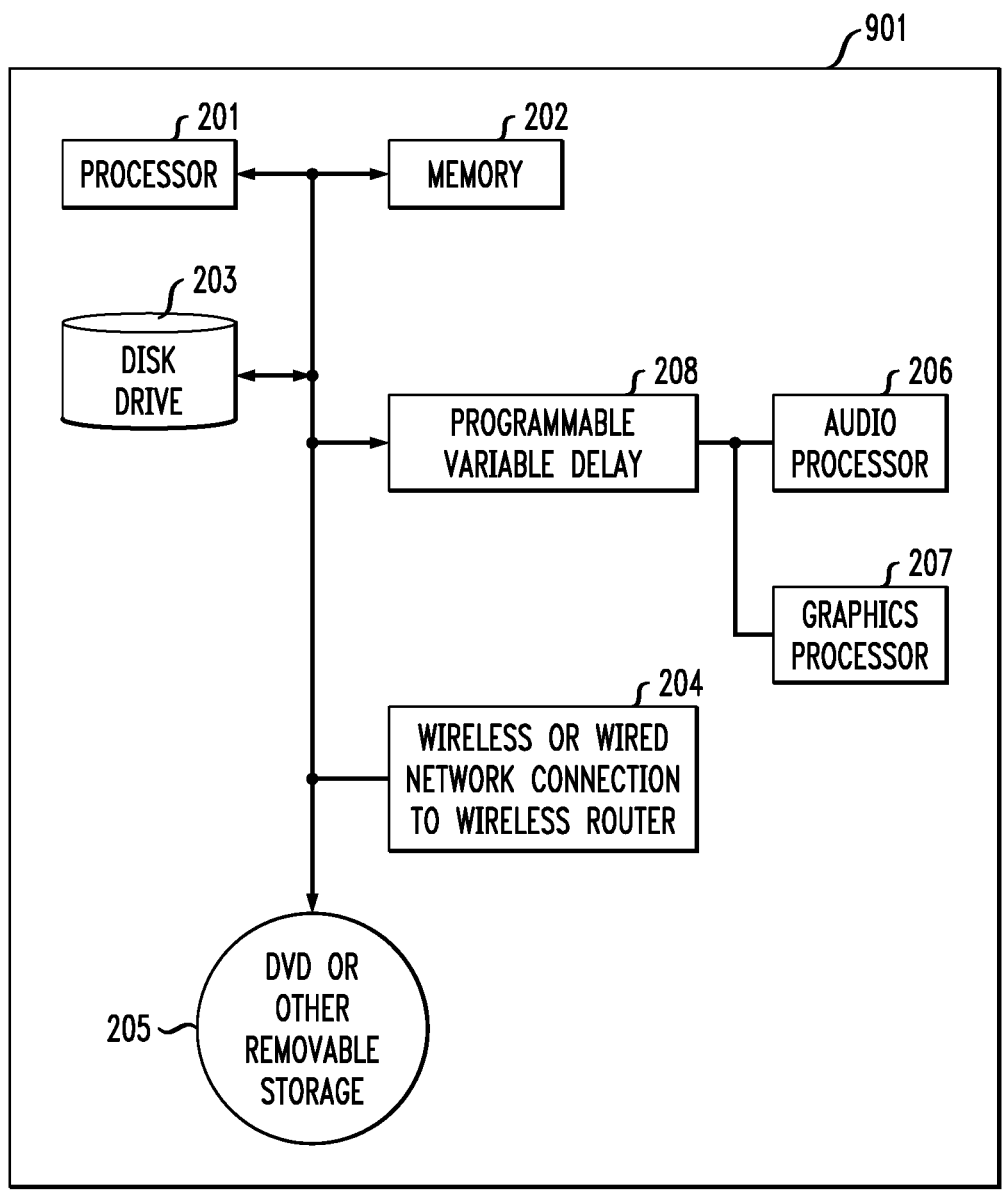
FIG. 3 is a functional block diagram of a content source device of the system of FIG. 2, according to an aspect of the invention.

Referring to FIG. 3, a preferred embodiment of a content source device 901 includes a processor 201; memory 202; disk drive 203 (or other persistent memory device); a wireless connection or a wired connection with access to a wireless router, designated generally as 204; and a DVD or other removable digital storage device 205. Also included are audio processor 206, graphics processor 207, and a programmable variable delay 208 (such as a FIFO buffer).

Figure 4:
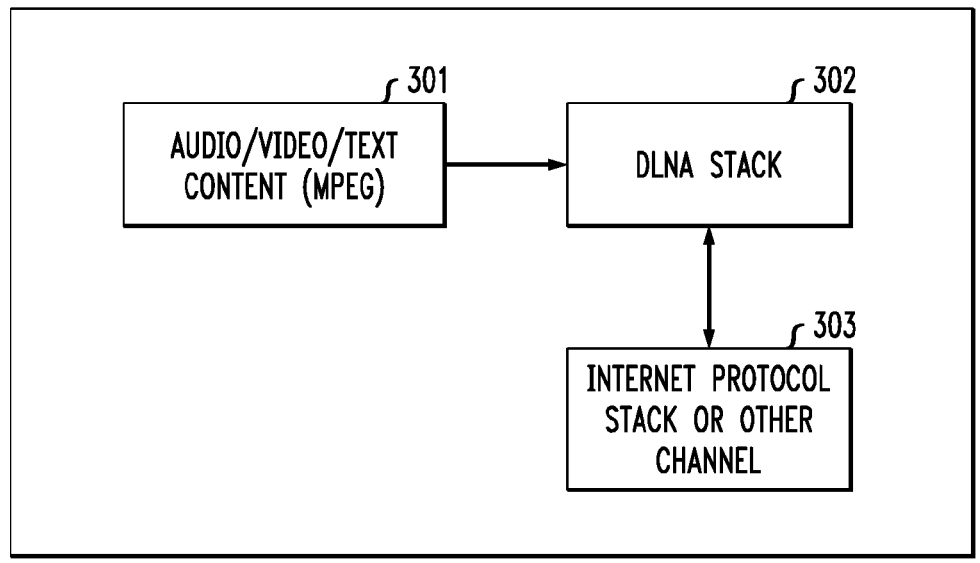
FIG. 4 shows exemplary software components within a typical content source and their relationship to each other within the content source, according to an aspect of the invention.

FIG. 4 shows exemplary software components within a typical content source 901 and their relationship to each other within the content source. Element 301 is the actual video, audio, text, and descriptive data; element 302 is a Digital Living Network Alliance (DLNA) or similar data presentation and/or discovery component; and element 303 is the software driver responsible for streaming the content to the video and audio devices (e.g., an internet protocol (IP) stack or other channel).

Figure 5:
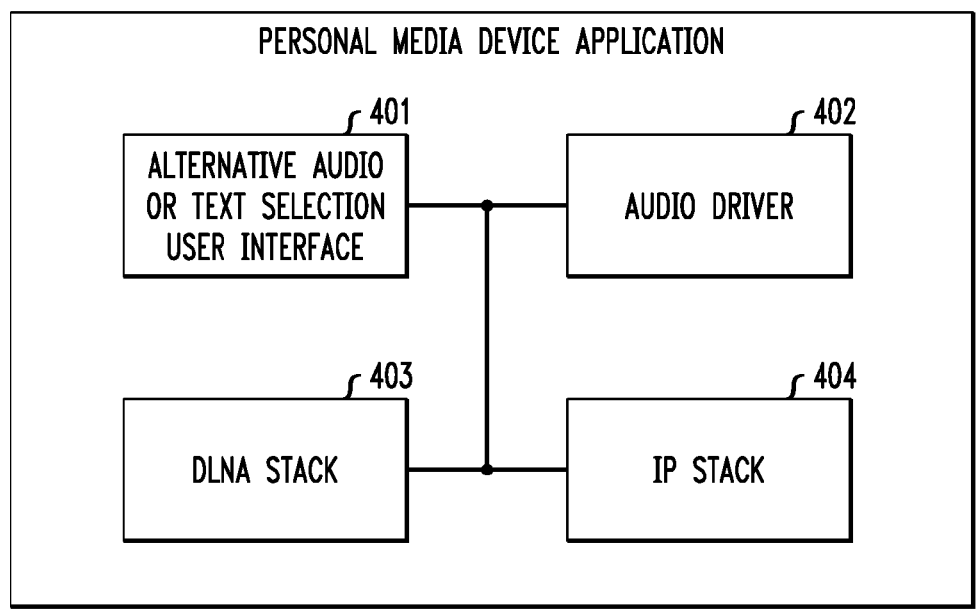
FIG. 5 shows exemplary software components within a personal media device (PMD) application, according to an aspect of the invention.

FIG. 5 depicts exemplary software components that make up the personal media device application. Element 401 is the user interface used to select the content desired as well as to configure the device and display text; element 402 is the audio device driver that sends the audio data to the audio hardware; element 403 is a DLNA protocol stack or equivalent mechanism to allow for the discovery and presentation of the content available on the content source; and element 404 is a network device driver (e.g., internet protocol (IP) stack) that sends and receives the DLNA protocol information to the content source as well as receives the text and audio data to be shown or played.

Figure 6:
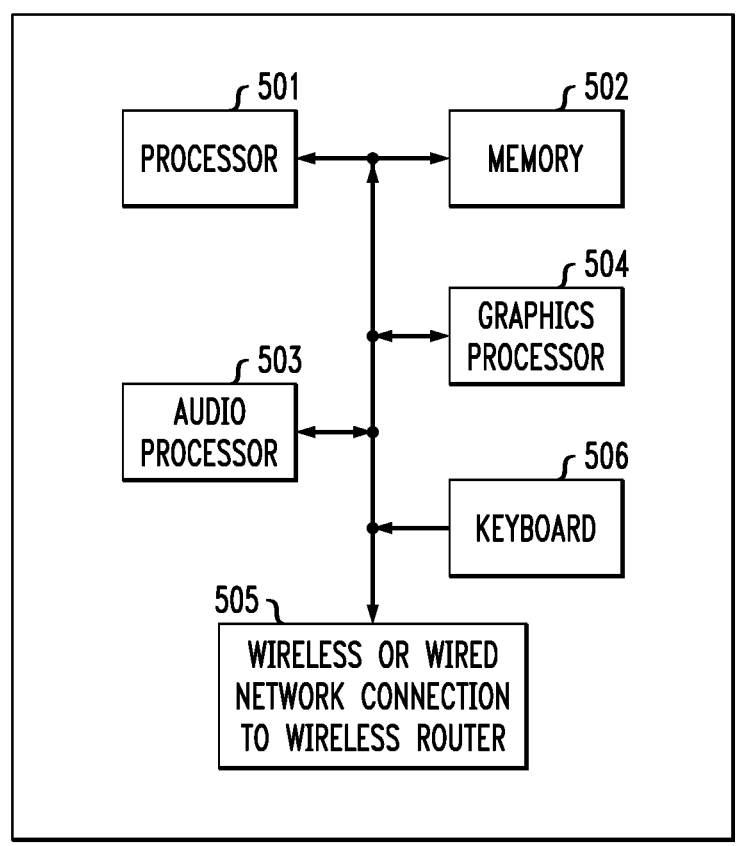
FIG. 6 shows the hardware within a typical PMD that is used by one or more embodiments of the invention.

FIG. 6 depicts hardware within a typical PMD that is used by one or more embodiments of the invention. Element 501 is a processor used to execute the application; and element 502 is a combination of volatile and non-volatile memory (e.g., random access memory (RAM) and electronically erasable programmable read-only memory (EEPROM)). The executable application program, operating system, and the like are stored in the non-volatile memory and the Random Access Memory is used for program execution variable storage as well as to buffer the audio and display data. Audio processor 503 is a device that converts digital audio data into the electrical signals which drive the audio transducers (speakers) within headphones to generate sound. Element 504 is a graphics processor that is connected to a small display device (not separately shown) and which provides the visual interface to the user. Element 505 is a network interface controller (NIC) that connects wirelessly to the content source 901 via the home Intranet or Internet. Element 506 is a keyboard containing a set of keys for selecting the language and adjusting the synchronization delay if necessary.

FIG. 2 shows a preferred embodiment. The content source device is preferably a television set top box 901 ("STB" or "CPE") connected to a video display 902. This preference is due to the rapid rate of change of set-top box technology compared to the relatively slow rate of change of the display technology. When the components are combined, the user runs the risk of having an obsolete display device simply because the content source—DVD, Internet, Cable, and the like became obsolete. Content is preferably stored in the MPEG-4 (H.264) format as this is the most popular among personal media devices. However, alternatives are also useable and a transcoding mechanism can be provided in one or more embodiments. Such a transcoding mechanism can include, for example, an adjunct digital signal processor (DSP) within the STB 901 or as a function of a general purpose processor with sufficient computational speed for a software implementation. A variety of hardware and software transcoders are available and known to the skilled artisan who, given the teachings herein, will be able to adapt same for use with one or more embodiments of the invention. Content can be added to the content source via Internet connection, cable service (DVR), or an external storage device 205. Content can also be streamed directly from an external service provider (e.g., from head end 150). Content source 901 preferably has Internet connectivity via radio frequency (RF) 904 or a separate wireless router (not shown). Element 905 depicts intranet connectivity.

In some instances, a STB could be designed that entirely relies on link 905 and communicates with both Internet and intranet. The Internet would be accessed via a wireless router in the home. Both scenarios are contemplated as in block 204, which depicts a network connection that is connected to a home network via wireless or wired connection to a wireless router. A router is sometimes referred to as a gateway because it is what connects the home (intranet) to the public Internet. Thus, instead of direct RF connectivity to the Internet, such as via a coaxial cable 904, unit 901 could have a wired or wireless 905 link to a router which itself connected to the Internet.

Processor 201 extracts the composite video and multiple-audio data from the storage device 203, 205 and buffers it in memory for timely distribution to a graphics processor 207. In other instances, streaming can be employed—for example, the content source 901 tunes (for example with a QAM RF tuner) to a television channel which has, say, an English soundtrack with a Spanish simulcast. A QAM demodulator pulls in the data stream and then the process is similar to the case when a program is accessed from the disk drive, except that it is received in a serial fashion. Thus, in this (streaming) instance, the composite video and multiple audio data is, in essence, extracted from a quadrature amplitude modulated RF signal or equivalent. Non-limiting examples of equivalents include data over fiber optics or an IP stream in H.264 or the like obtained over a wired or wireless network.

The movement from memory to the graphics processor may include a variable delay mechanism 208 (data FIFO or other) such that if there is a propagation delay between the local audio and display and the hand-held audio devices, the local audio/video display may be held back so that the display and audio may be synchronized correctly with the audio channel being provided to the external portable media devices or other alternative text-receiving devices. The graphics processor 207 converts the digital video signal into one appropriate for the display device; for example, analog composite, component, or digital via HDMI® (High Definition Multimedia Interface; registered mark of HDMI LICENSING, L.L.C., 1060 EAST ARQUES AVENUE, SUITE 100, SUNNYVALE Calif. 94085 USA) or Digital Visual Interface (DVI). Audio is sent to the audio processor 206 via the same delay mechanism for local audio playback. The delay for both audio and video will be the same in order to maintain synchronization. One or more embodiments additionally distribute alternative audio content in the form of audio data (MP3 and the like) directly to the network interface 204 for distribution to a PMD 903. The preferred mode of transmission is that of non-compressed pulse code modulated audio wrapped in IP frames. The IP frames should be short in duration in order to minimize the requirement for buffering and hence additional delay that would have to be compensated for in order to maintain synchronization between the remote audio devices and the local audio and video. "Short" in this context means short with respect to the buffer size. In a non-limiting example, a 100 byte packet would induce a 2.3 millisecond delay. Other instances could have different values. In general, the packets should be sufficiently short such that they do not introduce so much delay such that synchronization between the sound and the video track becomes an issue.

User interface 401, 504 is activated when the application is executed on the PMD. The application uses the DLNA stack to contact the content source 901 and obtain descriptive information concerning the alternative audio and text content available. Alternatively, the software could set up a stream of video and audio data from an external service provider via the Internet or other mechanism (e.g., MPEG over quadrature amplitude modulation (QAM) such as in network 101 and the like). Users begin playing the video and local audio through the local display 902 and the user with the personal media device selects the alternative audio or text content desired. If audio is selected, the personal media device then requests the content source 901 to stream the appropriate audio to it. Once received via the IP stack 404 and network interface controller (NIC) 505, the application sends the data to the audio driver 402 which interfaces to the local audio hardware 503 and provides sound to the listener. If text is selected, the user interface 401 displays the text in a synchronous manner with the display of the video content via the graphics processor 504. Synchronization is maintained between the PMD audio, PMD text, and the video presentation via limiting the propagation delay between the audio packets sent to the decoder for the external audio devices and the audio packets sent to the RF channel that connects to the personal media devices. It should be noted that synchronization is believed to be less of an issue in the case of subtitles.

Furthermore in this regard, there is, in at least some instances, a propagation delay in transmitting alternative audio or subtitles over to the personal media device. Thus, a variable delay buffer 208 can be employed going to the TV decoder 207, 206 and adjustments made so that by time the audio and video show up to the TV the corresponding alternative audio or subtitles also show up to the decoder (Graphics and Audio Processors 207, 206 which decode the digital data into the output signals.), and, through the decoder, within the personal media device. Programmable variable delay 208 can be implemented, for example, with a FIFO buffer.

Thus, the system preferably also provides an adjustment parameter to add a small propagation delay between the video and audio being delivered to the display and main audio and the packets sent to the PMDs, as shown at 208.

It will be appreciated that one or more embodiments allow people who speak different languages (e.g., multiple generations of an immigrant family) to view content in the same room on the same TV, with accommodation of different language support in a simultaneous viewing scenario. One or more instances provide multiple audio streams simultaneously along with any given video content such that audio in different languages may be received simultaneously with the video and each other by multiple receiver/decoder devices that allow the selection and playback of one of the audio streams provided.

In one or more embodiments, an entity such as a cable multiple system operator (MSO) facilitates download, installation, and launch of a suitable audio reception, selection and playback application (see, e.g., FIG. 5) by the customer onto his or her PMD. Upon launching the application, the user is prompted for his or her language preference among the audio available within the content. Once selected, the PMD connects to the proper audio stream for that particular language (or even an enhanced "director's commentary" audio program). The PMD software and hardware combination then receives, decodes, and presents the audio to the user connected via that particular PMD. Multicast synchronization is preferably implemented to ensure that the video and all audio streams are in sync with each other. A variety of current technologies are available for such synchronization. Non-limiting examples are disclosed in US Patent Publications 2008-0152309 and 2005-0276282, and in U.S. Pat. Nos. 5,594,660 and 5,959,684. The complete disclosures of US Patent Publications 2008-0152309 and 2005-0276282, and U.S. Pat. Nos. 5,594,660 and 5,959,684 are expressly incorporated herein by reference in their entireties for all purposes.

One or more embodiments thus provide "video stream bonding" wherein multiple portable audio/video devices, e.g. IPOD®, IPHONE®, IPAD® (registered marks of Apple Inc., Cupertino, Calif., USA); Zune® (registered mark of Microsoft Corporation, Redmond, Wash., USA); ANDROID® Phone, and the like are synchronized to the same video stream, with each presenting its own synchronized audio, closed captioning, and private data stream. One or more embodiments also enable multi-linguistic advertising, as in the case of different commercial video targeted to a given device's language and/or cultural settings, as well as interactive applications.

Some embodiments can be employed to stream multiple audio channels along with the video from existing high end television set top boxes, with suitable modifications to the set top boxes and PMDs, as described herein.

One or more embodiments provide support for same-room video viewing in multi-linguistic households, for the hearing impaired, and in cases of similar language or audio barriers. One or more embodiments allow customers with bi-lingual family members to view content together in their preferred or native language. In some instances, multiple-language subtitles are offered for those with both linguistic difference and aural impairment.

One or more instances, rather than amplifying audio for hearing impaired individuals, further allow one to watch video content in a preferred language without disturbing others. One or more embodiments allow content distributors to target and provide culturally preferred advertising and similar data. In another aspect, personalized closed captioning can be provided in some cases, as well as subtitles that are selectable on a language or enhanced feature basis.

In a non-limiting exemplary use case, a group may watch a video on device 902 while one or more members listen to the audio in a primary language; for example, on a speaker system associated with device 902. One or more other users listen in one or more different language via headphones on one or more corresponding personal media devices; the soundtracks in the alternate languages are synchronized with the video as is the audio in the primary language.

It is worthwhile noting that some embodiments can make use of an integrated circuit chip such as the Cirrus CF 5368 chip which can decode up to eight channels of audio. In a non-limiting example, such chip or a similar chip can be located on the PMD to pull out the audio packets. The Cirrus CF 5368 chip can be used, for example, in conjunction with the Cirrus CS4384 SPDIF receiver.

A variety of techniques can be used to communicate data between the PMDs 903 and device 901; e.g., Wi-Fi, IEEE 802.11, or other radio frequency (RF) mechanism, infrared (IR), Multimedia over Coax Alliance (MoCA), and the like. In some instances, the device 901 may send SAP signals (SIM Access Profile, a profile within BLUETOOTH) to the PMDs 903. The video and multiple audio data may, for example, be in MPEG-2 or MPEG-4. In some instances, one or more embodiments make use of S/PDIF, which is a data link layer protocol and a set of physical layer specifications for carrying digital audio signals between devices and components over either optical or electrical cable. S/PDIF is standardized in IEC 60958 as IEC 60958 type II. In such cases, the secondary audio may be extracted from the source and put into an S/PDIF stream, which is then encapsulated into TCP/IP (transfer control protocol/internet protocol) or other RF envelope for transmission to the PMDs 903. Software in the PMDs 903 pulls the audio out of the IP encapsulation, or a suitable chip is used to extract the audio packets, such as the above-mentioned Cirrus CF 5368 chip. In one or more embodiments, the S/PDIF connects to the CS 5368.

Note that in some instances, device 901 could also be realized as a WiFi- or MoCA-enabled DVD or BLURAY player interfacing with the PMDs 903 through a router.

By way of review, in FIG. 3, elements 201, 202, 203, and 205 are well-known physical devices or elements. Programmable variable delay 208 can be implemented, for example, by a FIFO buffer or the like which is a physical device. Audio and graphics processors 206 and 207 can be implemented, for example, as hardware elements, in a well-known manner. Audio processor 206 can be implemented as a digital-to-analog converter, for example. Graphics processor 207 can be implemented as a video board with one or more high-speed specialized chips, for example. Block 204 represents appropriate physical connectors and/or a transceiver and associated circuitry, for example. The elements can be connected by a physical data bus or the like.

Still continuing the review, in FIG. 4, block 301 represents data patterns extracted from a DVD or hard drive or obtained via streaming and then loaded into a physical memory; block 302 represents a well-known series of software components (Digital Living Network Alliance (DLNA)) that are stored on, e.g., disk drive 203, loaded into memory 202 and executed on processor 201 to cause the processor to carry out a series of steps; and block 303 represents the well-known internet protocol stack which can be obtained on a physical chip or, depending on the device, as a software stack stored, loaded, and executed in a similar manner.

Again, still continuing the review, in FIG. 5, block 402 represents a small, low-level piece of software which sets the registers within a physical digital-to-analog converter for purposes of volume changes and the like; block 403 represents a well-known series of software components (Digital Living Network Alliance (DLNA)) that are stored on, e.g., on non-volatile storage on the PMD 903, loaded into memory 502 and executed on processor 501 to cause the processor to carry out a series of steps; and block 404 represents the well-known internet protocol stack which can be obtained on a physical chip or, depending on the device, as a software stack stored, loaded, and executed in a similar manner. Block 401 represents an application which can, for example, be stored, loaded, and executed in a similar manner, and which includes instructions which cause the processor, in conjunction with blocks 504 and 506, to display prompts which allow the user to select the desired secondary audio asset (for example, simply a button which continuously changes the language that is decoded or a pair of buttons for moving forwards and backwards through the selections).

Yet further, by way of review, in FIG. 6, elements 501, 502, and 506 are well-known physical devices or elements. Audio and graphics processors 503 and 504 can be implemented, for example, as hardware elements, in a well-known manner. Audio processor 503 can be implemented as a digital-to-analog converter, for example. Graphics processor 504 can be implemented as a video board with one or more high-speed specialized chips, for example, or a simpler display approach can be used in a PMD in some instances. Block 505 represents appropriate physical connectors and/or a transceiver and associated circuitry, for example. The elements can be connected by a physical data bus or the like. Other input devices besides or in addition to keyboards can be employed.

Figure 7:
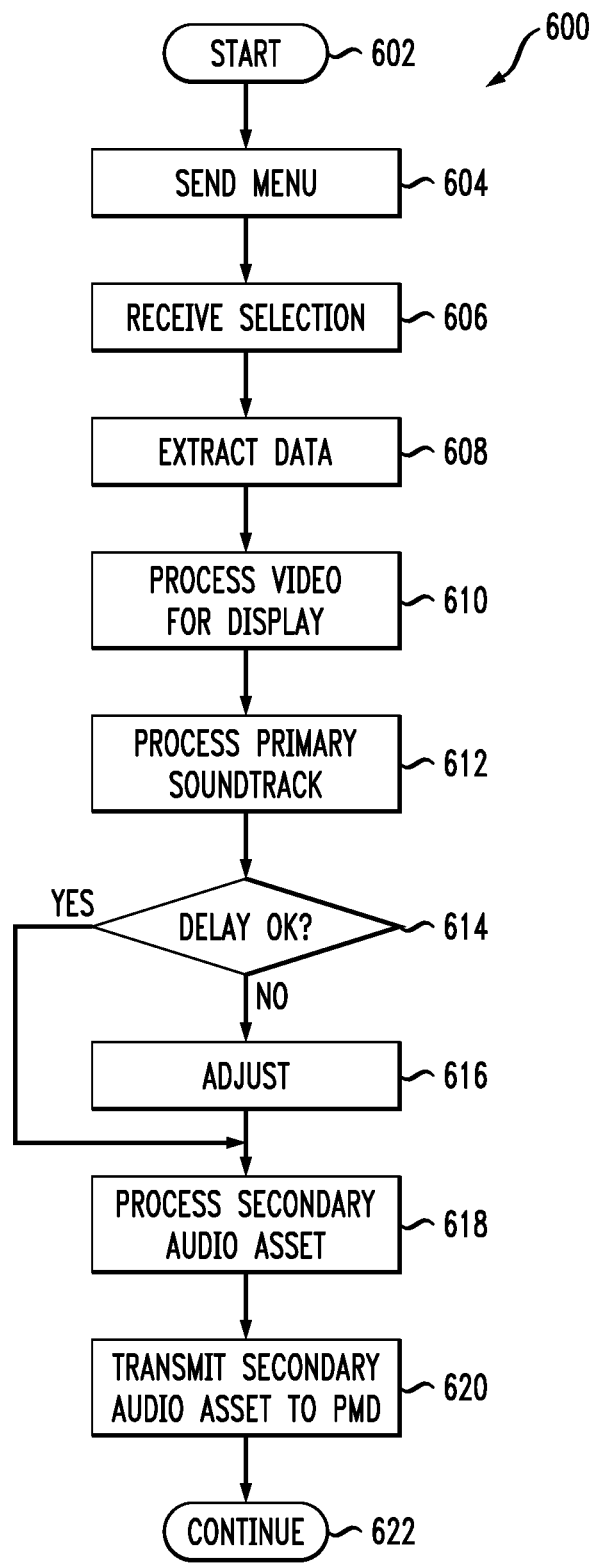
FIG. 7 is a flow chart showing exemplary method steps from the perspective of the content source device, according to an aspect of the invention.

Reference should now be had to flow chart 600 of FIG. 7, which begins in step 602. Given the discussion thus far, it will be appreciated that, in general terms, an exemplary method, according to an aspect of the invention, includes the step 608 of extracting digital video data and digital multiple-audio data from a source (e.g., 203, 205, or streaming from a network such as 101), using a hardware processor 201 in a content source device 901 within a premises. An additional step 610 includes processing the extracted digital video data for display on a main display device (e.g., 902) in the premises (for example, making use of graphics processor 207 as discussed above). A further step 612 includes processing the extracted digital multiple-audio data into a primary soundtrack in a primary language, to be listened to within the premises in synchronization with the displayed extracted digital video data (for example, making use of audio processor 206 as discussed above). The primary soundtrack corresponds to the displayed extracted digital video data, in the primary language. For example, the primary soundtrack could be English played over speakers associated with display 902, and synchronized with the video thereon. As used herein, a "soundtrack" simply means audio associated with a video, and may include speech and/or music, for example. A further step 618 includes processing the extracted digital multiple-audio data into at least one secondary audio asset, different than the primary soundtrack. An MPEG stream is a series of data including tables (program map tables) which describe the programs, which in turn include different audio and video streams. The description of the audio streams typically includes the three-character ISO 639 language descriptor.

As used herein, a "secondary audio asset" includes:
a secondary soundtrack in a different language than the first soundtrack,
a secondary soundtrack in the same language as the first soundtrack, but different from the first soundtrack (for example, descriptive audio in the same language as the first soundtrack), and/or
captions which textually represent audio, in the same or a different language as a primary or secondary soundtrack.

The soundtrack and/or text may pertain to the "main" video, e.g., a movie, and/or to alternative video features associated with the "main" video (e.g., ancillary information such as a director's commentary or the like).

A further step 620 includes transmitting the at least one secondary audio asset to a personal media device 903 within the premises (for example, via block 204), for apprehension by a user of the personal media device in synchronization with the displayed extracted digital video data (i.e., soundtrack or captions are aligned with the video). In a preferred but non-limiting approach, such synchronization is based on manual feedback from the user in the case of a secondary soundtrack, and is inherent in the case of captions due to the fact that typical propagation delays simply do not significantly impact the apprehension of textual captions in connection with the video.

Processing Continues at 622

With respect to multiple secondary audio assets, a number of approaches are possible (for example, primary soundtrack is English and secondary soundtracks in both Spanish and French). In some cases, an 8-channel device is employed with two stereo channels per language allowing four languages on a single chip (e.g., Cirrus CF 5368). It is believed that once any necessary delay has been introduced in the video display and primary soundtrack, all of the secondary audio assets will be adequately synchronized as they will likely arrive at the PMDs at the same time or sufficiently close to each other such that the synchronization will be adequate.

In a preferred approach, step 620 includes transmitting as packets addressed to the personal media device. In instances where Universal Plug and Play (UPnP) is employed, UPnP will provide the appropriate addresses.

As noted, in some cases, the at least one secondary audio asset transmitted in the transmitting step is a secondary soundtrack in a secondary language and/or a descriptive audio track. The secondary soundtrack corresponds to the displayed extracted digital video data, in the secondary language. In such cases, the transmitting step 620 can include, by way of example and not limitation, transmitting non-compressed pulse code modulated audio wrapped in IP frames. Captions could be transmitted, for example, encapsulated in IP frames. For example, in addition to Program and System Information Protocol (PSIP) data with the actual audio, text can easily be passed using wireless IP or the like. In a non-limiting example, the captions are in accordance with ISO/IEC 13818-3:1998(E) Appendix E Program related text (closed captioning).

Examples of the source include a persistent memory device such as 203 coupled to the hardware processor 201; a media drive 205, coupled to the hardware processor 201, and having a removable media therein; and content streamed to the content source device from an external service provider (e.g., over the Internet or via a video content network such as HFC network 101, a FTTH/FTTC network, a satellite network, or the like).

As noted, instead of or in addition to actual audio which can be played over a headphone or the like, in some cases, the secondary audio asset transmitted in the transmitting step 620 includes subtitles for display on the personal media device. It is currently contemplated that these subtitles are displayed by themselves, i.e., not superimposed over another display of the video on the PMD, because of the large amount of bandwidth needed to pass video. However, as higher bandwidth home networks become more commonplace, in some instances, display of video on the PMD is also possible. Such subtitles could be in the same language as the primary language, so that someone with a hearing disability but who speaks the same language as others can view them without disturbing others by their presence on the main display 902. In other cases, the subtitles transmitted for display on the personal media device are subtitles, in a language other than the primary language. In either case, the transmitted subtitles correspond to the displayed extracted digital video data.

Note that use of the term "subtitles" is not intended to be limiting as to where on the display the text is displayed to the user.

Optional step 606 includes obtaining, at the content source device 901, a menu selection from the user of the personal media device 903 (for example wirelessly via block 204). The menu selection specifies a chosen form of the second audio asset (i.e., what language, whether audio or captions or both, and so on). This step is optional—as noted, in some cases, all the available secondary audio assets are transmitted and a selection is made at the PMD using block 401.

Thus, again note that in one or more alternative embodiments, all languages available are transmitted from unit 901 and the PMD makes the selection. The interface could be as simple as selecting one of four audio channels to see what is available or providing a secondary IP path to provide a description of what audio is on what audio channel. For example, simply encapsulate the output of the PSIP in RF and send it to a receiver on the PMD where a selection is made as to which of, say, four stereo streams is to be played back—in the simplest case, no indication of the language need even be given to the user, who simply listens to all (say, four) available channels until finding the desired language. All languages may be multiplexed together, for example, and the user obtains the desired one by having the PMD identify the packets in that language by their headers.

In other instances, provide a filtering function wherein only the secondary audio assets requested by users of PMDs are actual sent from source 901 to PMD 903, advantageously saving bandwidth in the home network.

Optional step 604 includes providing, to the personal media device 903, from the content source device 901 a representation of a menu from which the menu selection can be made. The representation of the menu includes data indicative of available forms of the second audio asset. The menu can be displayed, for example, via blocks 401, 504, with menu selection, for example, via block 506 or a similar technique such as a pointing device.

Optional step 618 includes introducing a delay in the extracted digital video data for display on the main display device 902 and in the primary soundtrack in the primary language (e.g., as sent to processor 206), to account for the delay in the transmitting of the secondary audio asset to the personal media device. Delay can be introduced, for example, via block 208. The delay is introduced to maintain the synchronization of the secondary audio asset with the displayed extracted digital video data. Issues with the synchronization can be detected, for example, in decision block 614. If no problem ("YES" branch indicating delay is OK as-is), bypass step 616; if there is a problem ("NO" branch indicating delay is problematic), make required adjustments in step 616.

In some instances, the delay in the FIFO is set via feedback from the PMD user. For example, an IP channel is provided with control signals which pass from the PMD back to source 901 to lengthen or shorten the delay; for example, by lengthening or shortening the ring buffer employed for the FIFO to increase or reduce the delay, respectively. Other embodiments could employ automated techniques as set forth, for example, in the above-mentioned US Patent Publications 2008-0152309 and 2005-0276282, and U.S. Pat. Nos. 5,594,660 and 5,959,684.

In some embodiments, language-specific ancillary information, such as the above-mentioned director's commentary, is displayed simultaneously to different viewers in different languages, unlike current DVD metadata wherein only one language at a time is possible.

Figure 8:
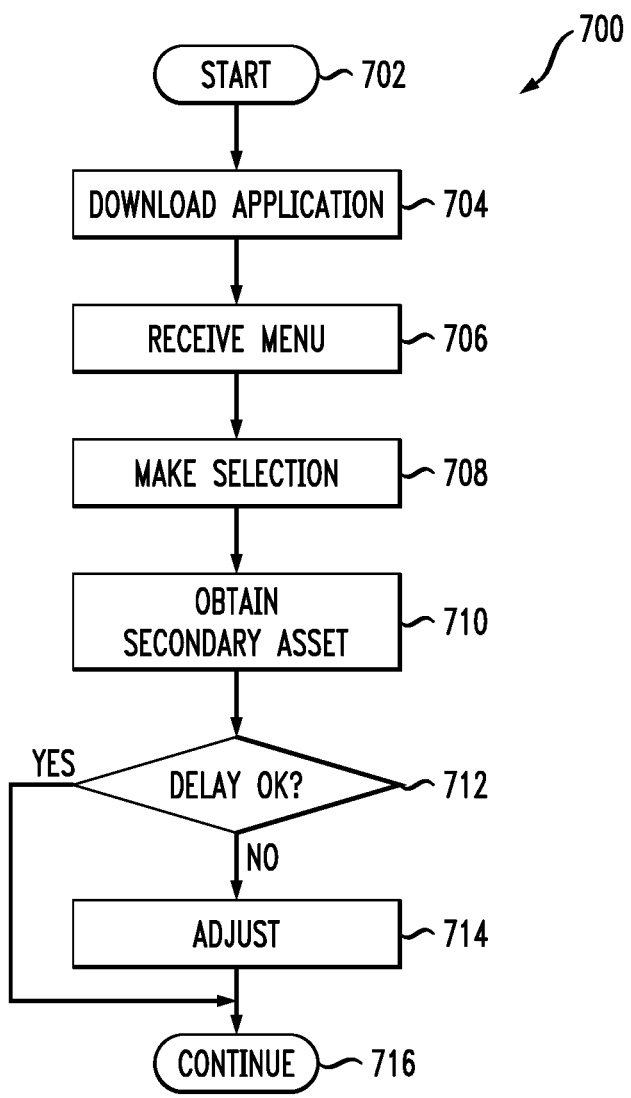
FIG. 8 is a flow chart showing exemplary method steps from the perspective of the personal media device, according to an aspect of the invention.

Reference should now be had to flow chart 700 of FIG. 8, which begins in step 702, and depicts a method for interaction between a personal media device 903 and a content source device 901 which provides, within a premises, digital video data for display on a main display device 902 in the premises, and a primary soundtrack in a primary language, to be listened to within the premises in synchronization with the displayed digital video data. One step 706 includes obtaining, at the personal media device within the premises, from the content source device within the premises, a representation of a menu. This can be done, for example, via blocks 204, 505. The representation of the menu includes data indicative of available forms of a secondary audio asset, as discussed above. An additional step 708 includes providing, from the personal media device, to the content source device, a menu selection specifying a chosen form of the secondary audio asset. A further step 710 includes obtaining, at the personal media device, from the content source device, the secondary audio asset, for apprehension by a user of the personal media device in synchronization with the displayed digital video data. The secondary audio asset is different than the primary soundtrack (as discussed above, textual material such as comprises subtitles for display on the personal media device and/or a secondary soundtrack in a different (secondary) language that corresponds to the displayed digital video data). As noted, such subtitles could be in the same language as the primary language, so that someone with a hearing disability but who speaks the same language as others can view them without disturbing others by their presence on the main display 902. In other cases, the subtitles transmitted for display on the personal media device are subtitles, in a language other than the primary language. In either case, the transmitted subtitles correspond to the displayed extracted digital video data.

Processing Continues at Step 716.

It is to be emphasized that FIG. 8 is a non-limiting example, and in some cases, as noted above, all the available secondary audio assets are transmitted and a selection is made at the PMD using block 401.

As noted, in some cases, step 710 includes obtaining the secondary audio asset as packets specifically addressed to the personal media device. Again, in some instances, all the secondary audio data is multiplexed together and the PMD determines which of the data is to be decoded; in still other instances, different frequencies or the like are available and the PMD tunes to the desired frequency.

As also noted, step 710 can be carried out in a variety of ways; when the secondary audio asset is a secondary soundtrack or a descriptive audio track, one non-limiting method includes obtaining non-compressed pulse code modulated audio wrapped in IP frames.

Optionally, an additional step 714 includes providing, from the personal media device, to the content source device, data indicative of an appropriate delay to be introduced in the displayed digital video data and the primary soundtrack so as to account for any delay in the obtaining, at the personal media device, from the content source device, the secondary audio asset. Such data is provided (for example, via blocks 204, 505) to maintain the synchronization of the secondary audio asset with the displayed digital video data, by adjusting variable delay 208. As used herein, "data indicative of an appropriate delay" includes data to set a delay where none exists and/or data to adjust or eliminate an existing delay. Refer to decision block 712, wherein step 714 is only carried out in case the current delay (if any) is not acceptable, as per the "NO" branch; otherwise, step 714 is bypassed as per the "YES" branch wherein the existing delay (if any) is acceptable.

Optional step 704 includes, for example, the case wherein the content source device 901 is provided by (i.e., to the consumer; it may well be manufactured by someone else) a multi-services operator; the multi-services operator invites the user of the personal media device to download thereto an appropriate software application (e.g., part or all of components in FIG. 5) which enables the personal media device at least to provide the menu selection to the content source device (the application might be downloadable directly from the MSO or the MSO might make it available to an "app store" from which the user downloads it). In other instances, the application could be provided to the PMD in another fashion.

At this point, it should be noted that any of the methods depicted herein can also include the actual display of video on the main screen 902 and/or display of the PMD; the actual display of captions on the main screen 902 and/or display of the PMD, and the actual reproduction of sounds corresponding to the soundtrack(s) by, for example, headphones on the PMD and/or speakers associated with the main screen 902.

In some instances, all soundtracks may be played on PMD headphones with none played out loud on speakers associated with the main screen 902.

In another aspect, an exemplary system can include device 901, device 903, or both device 901 and 903.

Thus, for example, an exemplary system includes a main memory 202; a main hardware processor 201 coupled to the main memory; a source (e.g., 203, 205, network 101 or Internet) of digital video data and digital multiple-audio data (e.g., a main soundtrack and at least one secondary audio asset) in data communication with the main hardware processor; a wireless interface 204 coupled to the main hardware processor; and a graphics processor 207 coupled to the main hardware processor. As used herein, a "wireless interface" is intended to encompass wireless hardware in the device 901 or a wired connection configured for connection to a wireless router.

The main hardware processor 201 and the main memory 202 are cooperatively configured to extract the digital video data and the digital multiple-audio data from the source; process the extracted digital video data and route the extracted video data to the graphics processor 207 for display in a premises; and process the extracted digital multiple-audio data into a primary soundtrack in a primary language, to be listened to within the premises in synchronization with the displayed extracted digital video data. The primary soundtrack corresponds to the displayed extracted digital video data, in the primary language. The main hardware processor 201 and the main memory 202 are also cooperatively configured to process the extracted digital multiple-audio data into a secondary audio asset (as discussed above), different than the primary soundtrack (i.e., text in the same or different language or audio in a different language). The wireless interface 204 is configured to facilitate transmitting the secondary audio asset to a personal media device 903 within the premises, for apprehension by a user of the personal media device in synchronization with the displayed extracted digital video data.

As noted, wireless interface 204 is preferably configured to facilitate transmitting the secondary audio asset as packets addressed to the personal media device 903.

The system preferably also includes an audio processor 206 which facilitates presentation of the primary soundtrack. In some instances, wireless interface 204 includes a wireless transmitter (including, of course, a suitable antenna or the like) which transmits the secondary soundtrack and/or descriptive audio track as non-compressed pulse code modulated audio wrapped in IP frames. Captions could be provided via another IP stream, for example.

In a preferred embodiments, the system also includes a variable delay block 208 upstream of the graphics processor 207, which introduces a delay in the extracted digital video data that is routed to the graphics processor, to account for a delay in the transmitting of the secondary audio asset to the personal media device, to maintain the synchronization of the secondary audio asset with the displayed extracted digital video data. In a general case, both a delay and a speeding up are provided for.

In some instances, the main hardware processor 201, the main memory 202, and the wireless interface 204 are cooperatively configured to provide to the personal media device a representation of a menu from which a menu selection can be made. The representation of the menu includes data indicative of available forms of the second audio asset. The main hardware processor 201, the main memory 202, and the wireless interface 204 are also cooperatively configured to obtain the menu selection from the user of the personal media device. The menu selection specifies a chosen form of the second audio asset. Once again is to be emphasized that this is a non-limiting example, and in some cases, as noted above, all the available secondary audio assets are transmitted and a selection is made at the PMD using block 401.

As noted, an exemplary system can include device 901, device 903, or both device 901 and 903. Thus, in some cases, the system just described also includes the personal media device 903, which in turn includes a personal media device hardware processor 501; a personal media device wireless interface 505 coupled to the personal media device hardware processor; an input-output interface coupled to the personal media device hardware processor; and a personal media device memory 502 which is coupled to the personal media device hardware processor and which stores, in a non-transitory manner, a software application which, when executed by the personal media device hardware processor, causes the input-output interface to present to the user the representation of the menu and obtain from the user the menu selection. The personal media device wireless interface 505 transmits the menu selection to the wireless interface 204 coupled to the main hardware processor 201.

In some instances, the software application stored in the personal media device memory 502, when executed by the personal media device hardware processor 501, further causes transmission, by the personal media device wireless interface 505, to the wireless interface 204 coupled to the main hardware processor 201, of data indicative of an appropriate delay (as defined above) to be introduced in the digital video data and the primary soundtrack so as to account for a delay in the obtaining, at the personal media device, from the content source device, of the secondary audio asset. The delay is introduced to maintain the synchronization of the secondary audio asset with the displayed extracted digital video data.

One or more additional aspects include an overall system within the context of a video content network such as that depicted in FIGS. 1, 1A, and 1B; the individual PMD with the appropriate application thereon, as in FIGS. 5 and 6; computer program products embodied in a tangible, computer-readable, recordable storage medium, such as, for example, all or part of the software-implemented blocks in FIGS. 4 and 5; means for carrying out the method steps, and the like.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 9:
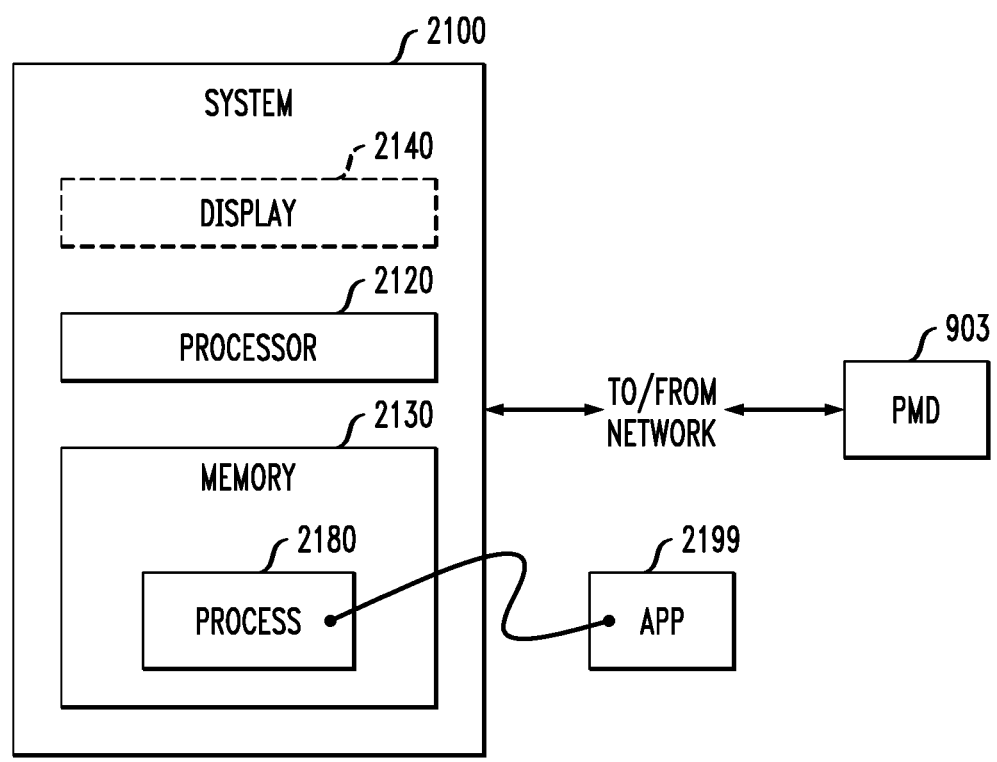
FIG. 9 is a block diagram of an exemplary computer system useful in implementing at least a portion of one or more embodiments of the invention.

FIG. 9 is a block diagram of a system 2100, processor 2120 of which is representative of processors associated with servers, clients, set top terminals or other devices 901, DBWAD, SRM, GSRM, MAS 104A, personal media devices, and any other elements with processing capability depicted in the other figures. In one or more embodiments, inventive steps are carried out by one or more of the processors in conjunction with one or more interconnecting network(s).

As shown in FIG. 9, memory 2130 configures the processor 2120 to implement one or more aspects of appropriate methods, steps, and functions (collectively, shown as process 2180 in FIG. 9). The memory 2130 could be distributed or local and the processor 2120 could be distributed or singular. The memory 2130 could be implemented as an electrical, magnetic or optical memory, or any combination of these or other types of storage devices. It should be noted that if distributed processors are employed, each distributed processor that makes up processor 2120 generally contains its own addressable memory space. It should also be noted that some or all of computer system 2100 can be incorporated into an application-specific or general-use integrated circuit. For example, one or more method steps could be implemented in hardware in an ASIC rather than using firmware. Display 2140 is representative of a variety of possible input/output devices (e.g., mice, keyboards, printers, etc.).

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system including hardware, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein. For example, a master copy 2199 of the PMD application of FIG. 5 may be stored in association with an "app store" or the like and downloaded to the PMD 903 over a wired or wireless network, as seen in FIG. 9.

As used herein, including the claims, a "server" includes a physical data processing system (for example, system 2100 as shown in FIG. 9) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/submodules in FIGS. 4 and 5, DBWAD, SRM/GSRM, MAS, and so on). The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, UNIX shell scripts (for example, to generate information to supply to the GSRM), Objective C (used, for example, in certain PMDs from Apple Inc.) and the like. Note that EBIF would typically only be employed in connection with a set-top box. RTSP and/or RPC can be employed for interface protocols, for example. Furthermore, non-limiting examples of useful database software include Access® software (registered mark of Microsoft Corporation, Redmond, Wash., USA); Oracle® software (registered mark of Oracle International Corporation, 500 Oracle Parkway, Redwood City, Calif. 94065, USA); Informix® software (registered mark of International Business Machines Corporation, Armonk, N.Y., USA); and structured query language (SQL) software available from many sources, including Microsoft Corporation, Redmond, Wash., USA).

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
    processing, by a content source device within a premises, digital video data for display on a main display device in said premises;
    processing, by said content source device, digital multiple-audio data into a primary soundtrack in a primary language, to be listened to within said premises in synchronization with said digital video data displayed by said main display device, said primary soundtrack corresponding to said displayed digital video data, in said primary language;
    introducing a delay in said digital video data for display on said main display device and in said primary soundtrack in said primary language, wherein said delay is controlled by said content source device using feedback received by said content source device from a personal media device;
    processing said digital multiple-audio data into at least one secondary audio asset, different than said primary soundtrack; and
    transmitting said at least one secondary audio asset to said personal media device within said premises, wherein said delay of said displayed digital video data and said primary soundtrack is synchronized to a playback of said at least one secondary audio asset by said personal media device.

2. The method of claim 1, wherein said transmitting comprises transmitting as packets addressed to said personal media device.

3. The method of claim 1, wherein transmitting said at least one secondary audio asset comprises transmitting non-compressed pulse code modulated audio wrapped in IP frames.

4. The method of claim 1, wherein said at least one secondary audio asset transmitted in said transmitting step comprises at least one of:
- a secondary soundtrack in a secondary language, said secondary soundtrack corresponding to said displayed digital video data, in said secondary language; and
- a descriptive audio track.

5. The method of claim 1, wherein said at least one secondary audio asset transmitted in said transmitting step comprises subtitles for display on said personal media device.

6. The method of claim 5, wherein in said transmitting step, said subtitles transmitted for display on said personal media device comprise subtitles, in a language other than said primary language, corresponding to said displayed digital video data.

7. The method of claim 1, further comprising obtaining, at said content source device, a menu selection from said personal media device, said menu selection specifying a chosen form of said second audio asset.

8. The method of claim 7, further comprising providing, to said personal media device, from said content source device, a representation of a menu from which said menu selection can be made, said representation of said menu comprising data indicative of available forms of said second audio asset.

* * * * *